United States Patent
Ocampo

(10) Patent No.: US 7,438,412 B2
(45) Date of Patent: *Oct. 21, 2008

(54) COLORED CONTACT LENS WITH A MORE NATURAL APPEARANCE

(75) Inventor: Gerardo J. Ocampo, Bridgeview, IL (US)

(73) Assignee: Novartis AG, Basel (CH)

(*) Notice: Subject to any disclaimer, the term of this patent is extended or adjusted under 35 U.S.C. 154(b) by 0 days.

This patent is subject to a terminal disclaimer.

(21) Appl. No.: 11/737,018

(22) Filed: Apr. 18, 2007

(65) Prior Publication Data

US 2007/0182922 A1    Aug. 9, 2007

Related U.S. Application Data

(63) Continuation of application No. 10/913,811, filed on Aug. 6, 2004, now Pat. No. 7,210,778, which is a continuation of application No. 10/181,100, filed as application No. PCT/US01/00067 on Jan. 2, 2001, now Pat. No. 6,827,440.

(60) Provisional application No. 60/174,288, filed on Jan. 3, 2000.

(51) Int. Cl.
*G02C 7/04* (2006.01)

(52) U.S. Cl. .................................... 351/162

(58) Field of Classification Search ................. 351/162
See application file for complete search history.

(56) References Cited

U.S. PATENT DOCUMENTS

| 3,168,100 A | 2/1965 | Rich |
| D211,757 S | 7/1968 | Urbach |
| 3,454,332 A | 7/1969 | Siegel |

(Continued)

FOREIGN PATENT DOCUMENTS

| CS | 1237629 | 6/1971 |

(Continued)

OTHER PUBLICATIONS

Declaration of Dr. Leroy Meshel in Support of Coopervision's Opposition to Wesely Jessen's Motion for a Preliminary Injunction, and attached Exhibits 1-13 (*Wesley Jessen Corp. v. Coopervision* (N.D. Cal., CV-01-03678 AHM)); May 25, 2001.

(Continued)

*Primary Examiner*—Jordan M Schwartz
(74) *Attorney, Agent, or Firm*—Gardner Groff Greenwald & Villanueva, PC

(57) ABSTRACT

A colored contact lens (10) having a non-opaque pupil section (20), an iris section (22) surrounding the pupil section (20), and a colored, opaque intermittent pattern made up of a plurality of elements located over the entire iris section (22) that leaves a substantial portion within the interstices of the pattern non-opaque, the pattern covering an effective amount of the iris section (22) to change the apparent color of the iris, the pattern having a plurality of portions, each of the portions being a different shade from each other portion, each of the portions overlapping each other portion at a plurality of points, thereby providing a lens (10) capable of changing the apparent color of the iris of a person wearing the lens (10) and imparting a very natural appearance.

12 Claims, 18 Drawing Sheets

U.S. PATENT DOCUMENTS

| | | | |
|---|---|---|---|
| 3,536,386 | A | 10/1970 | Spivack |
| 3,557,261 | A | 1/1971 | Wichterle |
| 3,679,504 | A | 7/1972 | Wichterle |
| 3,712,718 | A | 1/1973 | Legrand et al. |
| 3,794,414 | A | 2/1974 | Wesley |
| 3,846,199 | A | 11/1974 | Cappelli |
| 4,447,474 | A | 5/1984 | Neefe |
| 4,460,523 | A | 7/1984 | Neefe |
| 4,472,327 | A | 9/1984 | Neefe |
| 4,555,372 | A | 11/1985 | Kunzler et al. |
| 4,558,931 | A | 12/1985 | Fuhrman |
| 4,582,402 | A | 4/1986 | Knapp |
| 4,634,449 | A | 1/1987 | Jenkins |
| 4,639,105 | A | 1/1987 | Neefe |
| 4,640,805 | A | 2/1987 | Neefe |
| 4,668,240 | A | 5/1987 | Loshaek |
| 4,681,412 | A | 7/1987 | Lemelson |
| 4,701,038 | A | 10/1987 | Neefe |
| 4,704,017 | A | 11/1987 | Knapp |
| 4,719,657 | A | 1/1988 | Bawa |
| 4,720,188 | A | 1/1988 | Knapp |
| 4,744,647 | A | 5/1988 | Meshel et al. |
| 4,824,688 | A | 4/1989 | Covington |
| 4,840,477 | A | 6/1989 | Neefe |
| 4,867,552 | A | 9/1989 | Neefe |
| 4,889,421 | A | 12/1989 | Cohen |
| 4,946,269 | A | 8/1990 | Magdassi |
| 4,981,487 | A | 1/1991 | Da Costa |
| 5,018,849 | A | 5/1991 | Su et al. |
| 5,034,166 | A | 7/1991 | Rawlings et al. |
| 5,106,182 | A | 4/1992 | Briggs et al. |
| 5,116,112 | A | 5/1992 | Rawlings |
| 5,120,121 | A | 6/1992 | Rawlings et al. |
| 5,160,463 | A | 11/1992 | Evans et al. |
| 5,302,978 | A | 4/1994 | Evans et al. |
| 5,414,477 | A | 5/1995 | Jahnke |
| 5,637,265 | A | 6/1997 | Misciagno et al. |
| 5,793,466 | A | 8/1998 | Moncada |
| 5,936,705 | A | 8/1999 | Ocampo et al. |
| 5,963,298 | A | 10/1999 | Bard |
| 6,030,078 | A | 2/2000 | Ocampo |
| 6,132,043 | A | 10/2000 | Atkins et al. |
| 6,196,683 | B1 | 3/2001 | Quinn et al. |
| 6,523,953 | B2 | 2/2003 | Jahnke |
| 6,824,267 | B2* | 11/2004 | Streibig ............ 351/162 |
| 6,827,440 | B2* | 12/2004 | Ocampo ............ 351/162 |
| 7,210,778 | B2* | 5/2007 | Ocampo ............ 351/162 |
| 2003/0156249 | A1* | 8/2003 | Jahnke ............ 351/162 |

FOREIGN PATENT DOCUMENTS

| | | |
|---|---|---|
| CS | 1163617 | 9/1996 |
| DE | 62926 | 7/1892 |
| EP | 0 158 999 | 1/1990 |
| EP | 0 187 137 | 7/1990 |
| EP | 0 272 101 | 2/1991 |
| EP | 0472496 A2 | 2/1992 |
| EP | 0484045 A2 | 5/1992 |
| EP | 0 262 832 | 9/1992 |
| EP | 0 369 942 | 12/1993 |
| EP | 0 352 134 | 3/1994 |
| EP | 0 357 062 | 5/1994 |
| EP | 0 309 154 | 6/1994 |
| EP | 0 384 632 | 7/1994 |
| EP | 0 390 443 | 8/1995 |
| EP | 0 484 044 | 8/1995 |
| EP | 0982617 A1 | 3/2000 |
| GB | 2 006 114 | 5/1979 |
| GB | 2 202 540 | 9/1988 |
| GB | 2253919 A | 9/1992 |
| JP | 120192 | 7/1982 |
| WO | WO 98/03480 | 10/1983 |
| WO | WO 85/04679 | 10/1985 |
| WO | WO 91/06886 | 5/1991 |
| WO | WO 98/44381 | 10/1998 |
| WO | WO 99/46630 | 9/1999 |
| WO | WO 00/14590 | 3/2000 |
| WO | WO 00/14591 | 3/2000 |

OTHER PUBLICATIONS

Annexure to Amended Particulars of Objections Served by the Defendant on Aug. 7, 2001 and attached Exhibits 1-26 (*Wesley Jessen Corp.* and *CIBA Vision* (UK) *Ltd.* v. *Coopervision* (Central London County Court, Patents Court, Claim No. Pat. 01004).

Expert Report of Dr. Leroy Meshel (*Wesley Jessen Corp.* v. *Coopervision* (N.D. Cal., CV-01-03678 AHM); Jun. 15, 2002.

Rebuttal Expert Report of Michael G. Harris Regarding the Validity of U.S. Patent No. 5,414,477 and attached Exhibits A-S (*Wesley Jessen Corp.* v. *Coopervision* (N.D. Cal., CV-01-03678 AHM); Jul. 16, 2002.

Davies, Ian; "The Effect of Tinted Hydrogel Lenses on Iris Colour"; Optician; Contact Lens Monthly; pp. 21-24; Oct. 6, 1989.

Declaration of Herbert Fuhrman in Support of Coopervision's Oposition to Wesley Jessen's Motion for a Preliminary Injunction; Jun. 4, 2001.

Deposition of Charles Neefe; Nov. 3, 1992.
Deposition of Charles R. Briggs, O.D.; Oct. 27, 1992.
Deposition of Herbert Fuhrman; Oct. 30, 1992.
Deposition of Jacqueline Urbach; Dec. 8, 1992.
Deposition of Spiro Constance; Nov. 11, 1992.

Ehrich, Wulf & Epstein, Daniel; "Color Atlas of Contact Lenses"; 1988; pp. 8, 9, 120 and 121, particularly Fig. 21 at p. 9 and the accompanying text at p. 8; Theime Medical Publishers.

Hofer, Peter; "Weiche Kontaktlinsen Mit Kunstlicher Irif" ("Soft Contact Lenses with Artificial Iris"); paper read at the 21$^{st}$ Annual Convention of the International Society of Contact Lens Specialists in Jerusalem and subsequently published in National Optician Journal in Nov. 1981 (particularly Photograph 14).

Hoffmannbeck, Werner Otto; "Lentes de Contacto—teoria e aplicacoes"; 1977; p. 451; McGraw-Hill.

Key, James E. & Mobley, Carole; "Cosmetic Hydrogel Lenses for Therapeutic Purposes"; Contact Lens Forum; Apr. 1987; pp. 18, 20 and 22 (particularly Fig. 1 and the accompanying text).

Mandell, Robert B., O.D., Ph.D.; "Specialized Lens Types"; Contact Lens Practice; 1965, 1974, 1981, 1988; Fourth Edition, Chapter 26.

Meshel, Leroy G.; "Contact Lenses, the CLAO Guide to Basic Science and Clinical Practice"; Prosthetic Contact Lenses; 1984; Chapter 59; Little Brown & Co., 2d ed.; particularly Color Plate 59-4B.

Meshel, Leroy G.; "Prosthetic Contact Lenses"; Contact Lenses; 1984; pp. 59.1 to 59.9; (with color photographs).

Neefe Optical Laboratory Price Lists; Nov. 1974, May 1976, Nov. 1977 and Jan. 1978.

"Neefe Special Contact Lenses"; Contact Lens Forum; Jun. 1976.
Ophthalmic Optician; 1972; vol. 12, #14 thru 25.
Ophthalmic Optician; 1974; vol. 14, #1 thru 12.

Ruben, Montague; "Color Atlas of Contact Lenses (& Prosthetics)"; 1982; Photographs 289-291 at p. 78, photographs 571 and 572 at p. 137 and photographs 573 and 574 at p. 138.

Sohnges, C.P.; "A New Kind of Contact Lens"; 1967; Text for presentation with slides at the 13$^{th}$ Congress of the International Contact Lens Specialists in Athens, Greece (slides not included).

Voss, Erwin H.; "La verdad sobre ellente de contacto moderno"; 1973; Figures 17-12 and 17-13 and the accompanying text (no translation of figure legends).

Weinstock, Frank J.; "Tinted Soft Lenses: The Full Spectrum"; Contact Lens Fitting, A Clinical Test Atlas; 1989; Chapter 8.

Wilson, Michael S. & Millis, Elisabeth, A.W.; "Contact Lenses in Ophthalmology"; Butterworths; 1988; pp. v, vii, viii, and 118, particularly Figure 13.13 at p. 118.

* cited by examiner

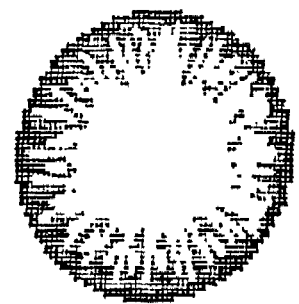
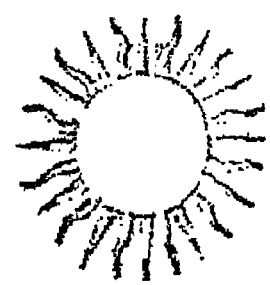
FIG. 12
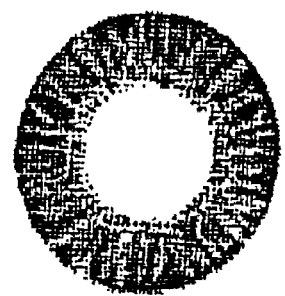

COLORED CONTACT LENS WITH A MORE NATURAL APPEARANCE

RELATED APPLICATIONS

This application is a continuation of U.S. patent application Ser. No. 10/913,811, filed Aug. 6, 2004, which is a continuation of U.S. patent application Ser. No. 10/181,100, filed Jul. 3, 2002, now U.S. Pat. No. 6,827,440, which is a national phase of International Application PCT/US01/00067, filed Jan. 2, 2001, which claims the benefit under 35 U.S.C. § 119(e) of the filing date of the provisional U.S. patent application having Ser. No. 60/174,288, filed on Jan. 3, 2000, which is hereby incorporated by reference.

TECHNICAL FIELD

The present invention relates to colored contact lenses and in particular to such lenses having multiple opaque colored portions that form a pattern that can change the apparent color of the iris while imparting a very natural appearance.

BACKGROUND OF THE INVENTION

Early attempts to modify or enhance the color of one's eyes utilized colored contact lenses with a simple solidly colored area that covered the iris portion of the eye. However, contact lenses with this type of opaque coloring imparted a very unnatural appearance. Other types of colored contact lenses were developed, such as Wichterle, U.S. Pat. No. 3,679,504, which discloses an opaque lens having an iris of more than a single color artistically drawn or photographically reproduced. However, such lenses did not look natural and as such never achieved commercial success. Other attempts to produce an opaque lens with a natural appearance are disclosed in U.S. Pat. No. 3,536,386, (Spivak); U.S. Pat. No. 3,712,718 (LeGrand), U.S. Pat. No. 4,460,523 (Neefe), U.S. Pat. No. 4,719,657 (Bawa), U.S. Pat. No. 4,744,647 (Meshel et al.), U.S. Pat. No. 4,634,449 (Jenkins); European Patent Publication No. 0 309 154 (Allergan) and U.K Patent Application No. 2 202 540 A (IGEL).

Commercial success was achieved by the colored contact lens described in Knapp (in U.S. Pat. No. 4,582,402) which discloses a contact lens having, in its preferred embodiment, colored, opaque dots. The Knapp lens provides a natural appearance with a lens that is simple and inexpensive to produce, using a simple one-color printed dot pattern. Although the intermittent pattern of dots does not fully cover the iris, it provides a sufficient density of dots that a masking effect gives the appearance of a continuous color when viewed by an ordinary observer. Knapp also discloses that the printing step may be repeated one or more-times using different patterns in different colors, since upon close examination the iris is found to contain more than one color. The printed pattern need not be absolutely uniform, allowing for enhancement of the fine structure of the iris. The one-color Knapp lenses currently achieving commercial success have their dots arranged in an irregular pattern to enhance the structure of the iris. However, neither the Knapp commercial lenses, nor the Knapp patent disclose or suggest how one would arrange a pattern of dots having more than one color to achieve a more natural appearance.

Various efforts have been made to improve on the Knapp lens. U.S. Pat. No. 5,414,477 to Jahnke discloses the application of the intermittent ink pattern in two or more portions of distinct shades of colorant to provide a more natural appearance.

Other attempts to create a more natural appearing lens include U.S. Pat. No. 5,120,121 to Rawlings, which discloses a cluster of interconnecting lines radiating from the periphery of the pupil portion to the periphery of the iris portion. Further, European Patent No. 0 472 496 A2 shows a contact lens having a pattern of lines that attempts to replicate the lines found in the iris.

Despite these efforts, the contact lens industry continues to seek a low-cost, colored lens that can enhance or modify the eye color, while providing the depth and texture that is inherent in the human iris.

SUMMARY OF THE INVENTION

The present invention is based on the surprising discovery that a pattern having multiple-color opaque portions can achieve a more natural appearing iris if configured properly. The improvement in appearance over the one-color Knapp lenses and the multiple-color Jahnke lenses is startling. Like the one and two color lenses, the lenses of this invention are able to cause a fundamental change in the apparent color of the wearer's iris, e.g. from dark brown to light blue or green. Although a preferred embodiment of the invention is a three color lens wherein different colors overlap, more than three colors are contemplated, and lenses wherein all three (or more) of the different colors overlap are also contemplated.

One objective of the invention is to provide a colored contact lens with a non-opaque pupil section, an iris section surrounding the pupil section, and a colored, opaque intermittent pattern over the iris section. The elements of the pattern are indiscernible to the ordinary viewer and are made up of a first portion of the elements of the pattern, which is a first shade, and a second portion of the elements of the pattern, which is a second shade different from said first shade, and a third portion of the elements of the pattern, which is a third shade different from said second shade and either different or the same as the first shade. Each of the three portions contain overlapping, mixing and blending elements consisting of or making up, uniform and non-uniform dots, islands of colors, worms, starbursts, corkscrews, spokes, spikes, striations, radial stripes, zig-zags and/or streaks, in combination or separately. Further, each of the overlapping portions may or may not extend from one end of the non-opaque pupil section to the periphery of the iris section. The blending of these various portions creates a lens capable of changing the apparent color of the iris of a person wearing the lens, while imparting a very natural appearance.

Another objective of the invention is to provide a colored contact lens with a non-opaque pupil section, an iris section surrounding the pupil section, and a colored, opaque intermittent pattern over the iris section. The elements of the pattern are indiscernible to the ordinary viewer and are made up of a first portion of the elements of the pattern, or the outermost starburst, which is a first shade, and a second portion of the elements of the pattern, or the outer starburst, which is a second shade different from said first shade, and a third portion of the elements of the pattern, or the inner starburst, which is a third shade different from said second shade and either different or the same as the first shade. The outermost starburst has a greatest concentration of elements located generally outside of the outer starburst, and the outer starburst has a greatest concentration of elements located generally outside the inner starburst. A first uneven border differentiates the outermost and outer starbursts, although there is overlap of the outermost and outer starbursts. A second uneven border differentiates the outer and inner starbursts, although there is overlap between the outer and inner starbursts. Thus, a lens capable of changing the apparent color of the iris of a person wearing the lens and imparting a very natural appearance is provided.

Another objective of the invention is to provide a colored contact lens with a non-opaque pupil section, an iris section surrounding the pupil section, and a colored, opaque intermittent pattern over the iris section, which leaves a substantial portion within the interstices of the pattern non-opaque. The pattern covers at least about 25 percent of the area of the iris section. The elements of the pattern are indiscernible to the ordinary viewer. A first portion of the elements of the pattern, or the outermost starburst, is of a first shade, and a second portion of the elements of the pattern, or the outer starburst, is of a second shade different from said first shade, and a third portion of the elements of the pattern, or the inner starburst, is of a third shade different from said second shade and either different or the same as the first shade. The outermost starburst has a greatest concentration of elements located generally outside of the outer starburst, and the outer starburst has a greatest concentration of elements located generally outside of the inner starburst. A first uneven border differentiates the outermost and outer starbursts although the outermost and outer starbursts overlap, and a second uneven border differentiates the outer and inner starbursts although the outer and inner starbursts overlap. The minimum distance of the first uneven border from the outer perimeter of said iris section is from about 5% to about 60% of the radial width of said iris section. The maximum distance of the first uneven border from the outer perimeter of said iris section is from about 25% to about 95% of the radial width of the iris section. The minimum distance of the second uneven border from the outer perimeter of the iris section is from about 15% to about 75% of the radial width of the iris section, and the maximum distance of said second uneven border from the outer perimeter of the iris section is from about 50% to about 95% of the radial width of the iris section. Thus, a contact lens capable of changing the apparent color of the iris of a person wearing the lens and imparting a very natural appearance is provided.

Another objective of the invention is to provide a colored contact lens with a non-opaque pupil section, an iris section surrounding the pupil section, and a colored, opaque intermittent pattern over the iris section, which leaves a substantial portion within the interstices of the pattern non-opaque. The pattern covers at least about 25 percent of the area of the iris section. The elements of the pattern are indiscernible to the ordinary viewer. A first portion of the elements of the pattern, or the outermost starburst, is of a first shade, and a second portion of the elements of the pattern, or the outer starburst, is of a second shade different from said first shade, and a third portion of the elements of the pattern, or the inner starburst, is of a third shade different from said second shade and either different or the same as the first shade. The outermost starburst has a greatest concentration of elements located generally outside of the outer starburst, and the outer starburst has a greatest concentration of elements located generally on the outside of the inner starburst. A first uneven border differentiates the outermost and outer starbursts although the outermost and outer starbursts overlap, and a second uneven border differentiates the outer and inner starbursts although the outer and inner starbursts overlap. The minimum distance of the first uneven border from the outer perimeter of said iris section is from about 15% to about 50% of the radial width of said iris section. The maximum distance of the first uneven border from the outer perimeter of said iris section is from about 45% to about 95% of the radial width of the iris section. The minimum distance of the second uneven border from the outer perimeter of the iris section is from about 15% to about 65% of the radial width of the iris section, and the maximum distance of said second uneven border from the outer perimeter of the iris section is from about 60% to about 95% of the radial width of the iris section. Thus, a contact lens capable of changing the apparent color of the iris of a person wearing the lens and imparting a very natural appearance is provided.

Yet another objective of the invention is to provide a colored contact lens with a non-opaque pupil section, an iris section surrounding the pupil section, and a colored, opaque intermittent pattern over the iris section, which leaves a substantial portion within the interstices of the pattern non-opaque. The pattern covers an effective amount of the iris section to change the apparent color of the iris. The pattern is made up of multiple portions, each of which is a different shade from the other portion. These portions may or may not overlap each other at multiple points. At least one of the multiple portions is a design that contains either uniform or non-uniform dots, islands of color, worms, starbursts, spokes, spikes, striations, radial stripes, zigzags and/or streaks, or some other design that, along with the other portions, provides a lens capable of changing the apparent color of the iris of the person wearing the lens, while imparting a very natural appearance.

Yet another objective of the invention is to provide a colored contact lens with a non-opaque pupil section, an iris section surrounding the pupil section, and a colored, opaque intermittent pattern over the iris section, which leaves a substantial portion within the interstices of the pattern non-opaque. The pattern, which is made up of elements, covers an effective amount of the iris section to change the apparent color of the iris. The pattern is made up of multiple portions, each of which is a different shade from the other portion. Further, one of these portions is the darkest shade, one of these portions is the lightest shade, and the pattern is configured so that the darkest shaded portion has the greatest concentration of elements located generally outside the other portions. This design provides a lens capable of changing the apparent color of the iris of the person wearing the lens, while imparting a very natural appearance.

Yet another objective of the invention is to provide a colored contact lens with a non-opaque pupil section, an iris section surrounding the pupil section, and a colored, opaque intermittent pattern over the iris section, which leaves a substantial portion within the interstices of the pattern non-opaque. The pattern, which is made up of elements, covers an effective amount of the iris section to change the apparent color of the iris. The pattern is made up of at least three portions, each of which is a different shade from each other portion. Each of the portions overlap the other portion at multiple points. These overlapping portions blend, mix or commingle together, or appear to blend, mix or commingle together, producing unique textures, colors and patterns that make the eye look natural when the contact lens is placed on the eye. To obtain the commingling or blending of the portions, in some instances the different shades will be printed in the same location or close enough that the difference in location is not discernible. This design provides a lens capable of changing the apparent color of the iris of a person wearing the lens, while imparting a very natural appearance.

It can be easily understood that other colored lenses having patterns with multiple portions (having different shades or colors) can be designed and still fall within the scope of the present invention.

The term "non-opaque" as used herein is intended to describe a part of the lens that is uncolored or colored with translucent coloring.

The term "second shade different from said first shade" (or some similar language) as used herein is intended to mean that both shades are of totally different colors, such as blue and hazel; or that both shades are the same basic color, but having different intensities such as light blue and dark blue.

The term "ordinary viewer" is intended to mean a person having normal 20-20 vision standing about 5 feet from a person wearing the lenses of this invention.

BRIEF DESCRIPTION OF THE DRAWINGS

FIG. 12 illustrates three contact lens patterns and the combined contact lens design in accordance with the present invention;

DETAILED DESCRIPTION OF THE PREFERRED EMBODIMENTS

Figure 1:
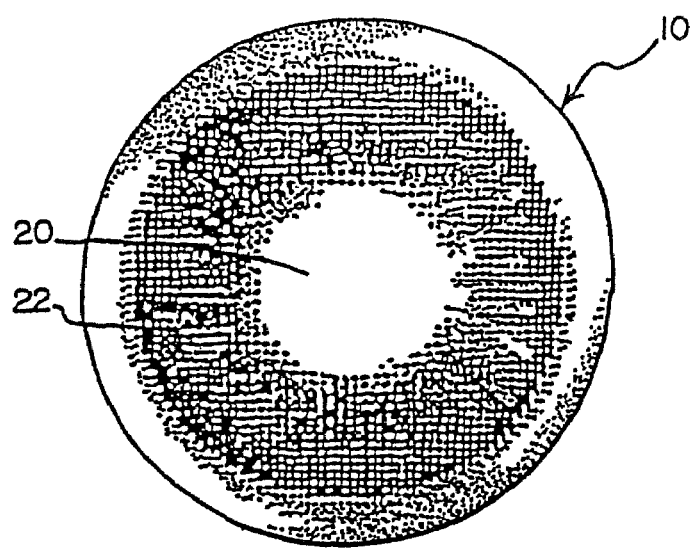
FIG. 1 illustrates a contact lens pattern in accordance with the present invention.

FIG. 1 shows a contact lens 10 in accordance with the present invention. It has a non-opaque pupil section 20 in the center of lens, and an annular iris section 22 surrounding the pupil section. For hydrophilic lenses a peripheral section (not shown) surrounds iris section 22. A colored, opaque, intermittent pattern is located over the iris section 22, as show in FIG. 1. The pattern leaves a substantial portion of the iris section within the interstices of the pattern non-opaque. The non-opaque areas of the iris section 22 appear white in FIG. 1.

The elements of the pattern are preferably dots, and especially preferred are dots, some of which run together, as shown in FIG. 1. Certain portions of the iris section 22 are less densely covered with dots than other portions.

The opaque pattern or patterns can be made up of dots having regular or irregular, uniform or non-uniform shapes, for example, round, square, hexagonal, elongated, or other dot shapes. Further, the elements of the pattern may have a shape other than dots, so long as the elements are undescrinable to the ordinary viewer, cover between 10 and 30 percent, preferably about 20 percent of the iris, and leave a substantial portion of the iris section within the interstices of the pattern non-opaque. The patterns that make up the portions of the iris can be islands of color or worms, corkscrews, starbursts, spokes, spikes, striations, radial stripes, zig-zags and streaks. In certain cases, a single color background is used to complement the multi-pattern design. These patterns blend with each other to provide a colored contact lens that enhances the structure of the iris of a person wearing the lens.

Figure 2:
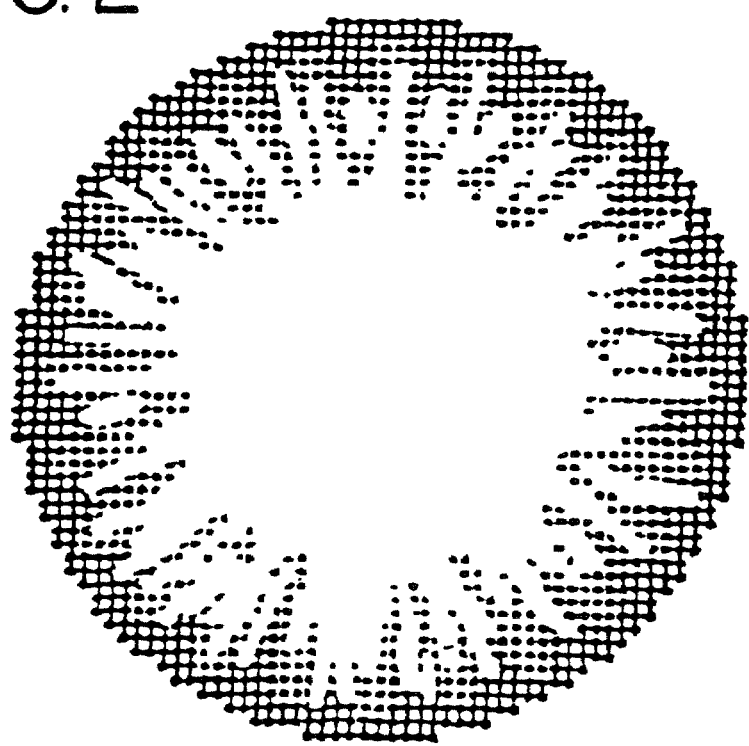
FIG. 2 illustrates a contact lens pattern indicating an outermost starburst in accordance with the present invention.

The improvement of this invention is a multiple color pattern that greatly improves the natural appearance of the wearer's iris, even over that of one and two color lenses. To produce this improvement, three (or more) colored patterns are printed in three or more portions. A first portion of the elements are of a first shade and generally have a greatest concentration of dots or other elements located generally on the outside of, but within, the iris section, i.e. at or near the outer perimeter of the annular iris section. This section may be referred to as the outermost starburst. A preferable first outside portion pattern or outermost starburst is shown in FIG. 2. Black, or some other dark color such as gray, dark-brown or dark blue, is most often used as the color of the outermost starburst.

A second portion (the outer starburst) of the elements are a second shade, which is different from the first shade, and has elements with a greatest concentration located generally on the inside of the outermost starburst, and generally, although not always, surrounded by the outermost starburst portion. A preferable second portion or outer starburst appears in FIG. 3. The outer starburst can be many colors, for example, blue, gray, brown, light blue, turquoise, violet, blue-violet, aqua, yellow or green.

A third portion (the inner starburst) of the elements are of a third shade, which is different from the second shade and either the same or different from the first shade. This third portion has a greatest concentration of elements located generally, but not always, on the inside of the other two portions. Generally, the greatest concentration of elements of the third portion is surrounded by the concentration of elements of the other two portions. A preferable third inside portion pattern or inner starburst appears in FIG. 4. A preferred color for the inner starburst is hazel, but other colors to be used include yellow, yellow-green, brown, yellow-brown, gold and orange. FIG. 1, a preferred embodiment of the present invention, shows a combination of FIGS. 2, 3 and 4.

Figure 3:
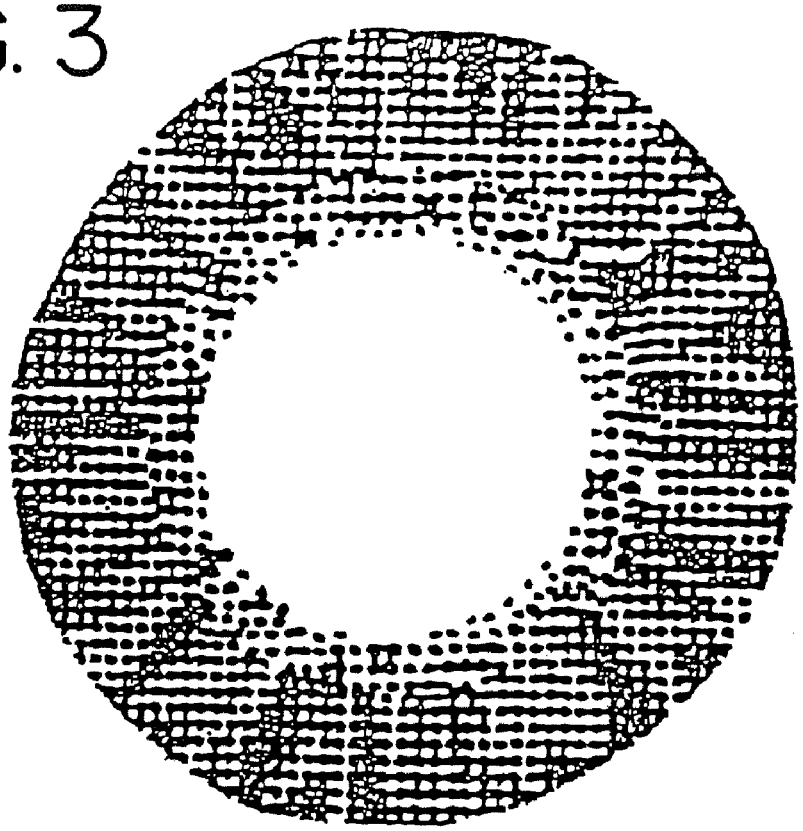
FIG. 3 illustrates a contact lens pattern indicating an outer starburst in accordance with the present invention.
Figure 4:
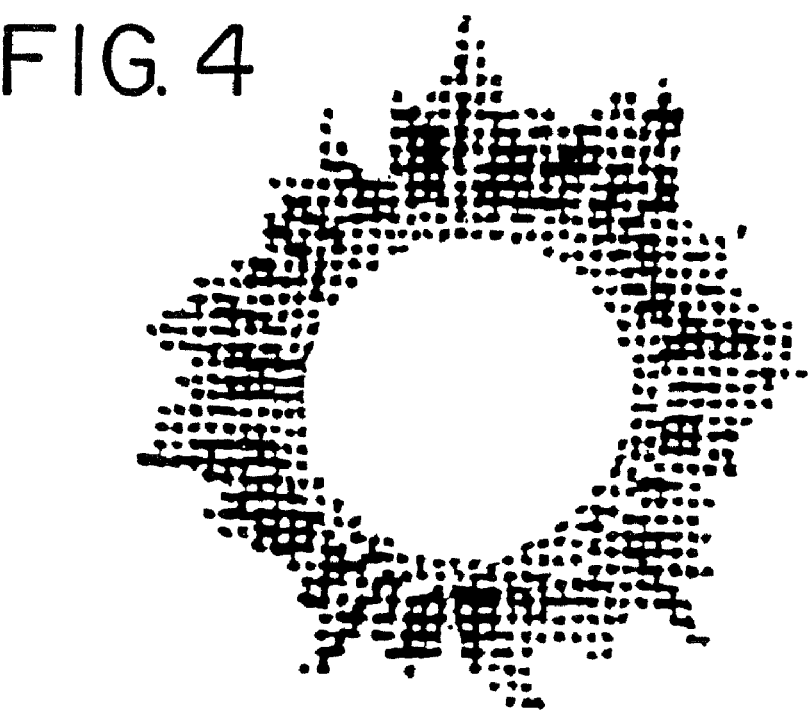
FIG. 4 illustrates a contact lens pattern indicating an inner starburst in accordance with the present invention.
Figure 5:
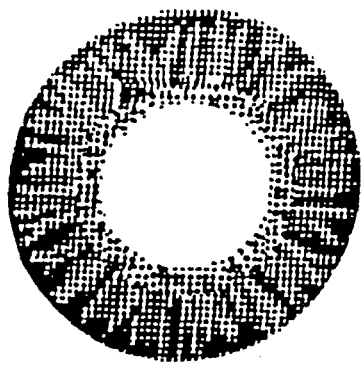
FIGS. 5A-5C illustrate three contact lens patterns in accordance with the present invention.
Figure 5:
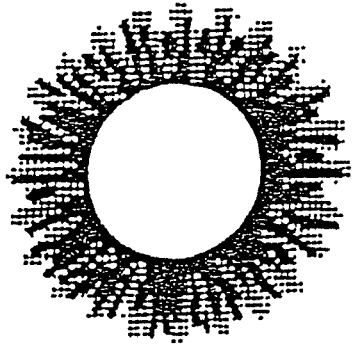
Figure 6:
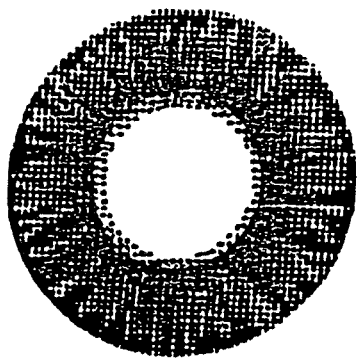
FIG. 6 illustrates a contact lens design based on the combination of FIGS. 5A-5C in accordance with the present invention.
Figure 5:
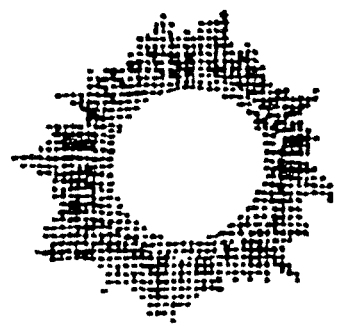
Figure 7:
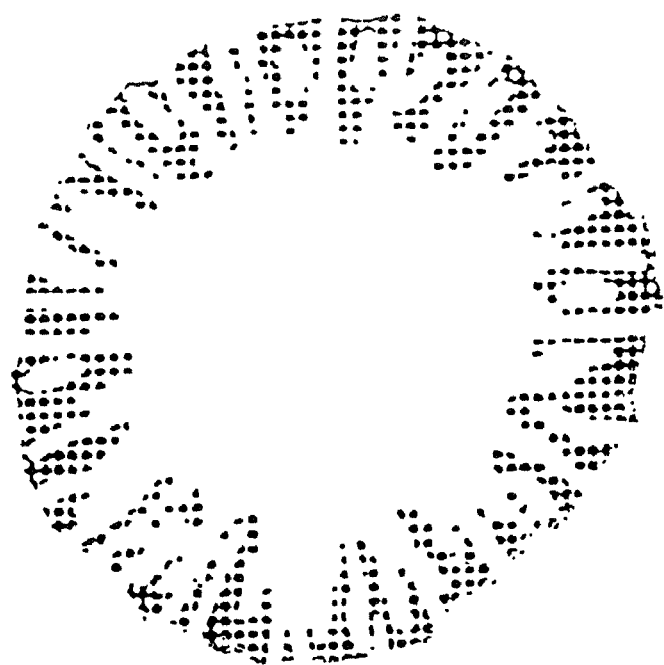
FIG. 7 illustrates a contact lens pattern with elements removed from the periphery of the pattern in accordance with the present invention.
Figure 8:
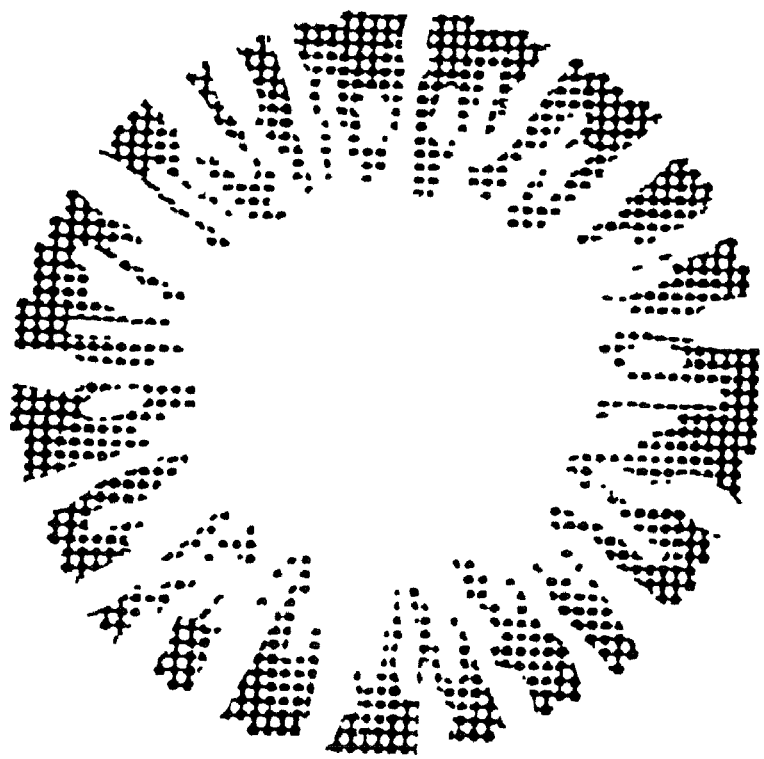
FIG. 8 illustrates a contact lens pattern that is not substantially continuous in accordance with the present invention.
Figure 9:
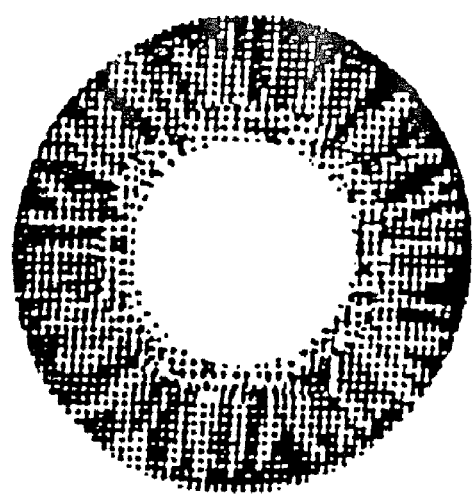
FIG. 9 illustrates three contact lens patterns, one of which is not substantially continuous in accordance with the present invention.
Figure 9:
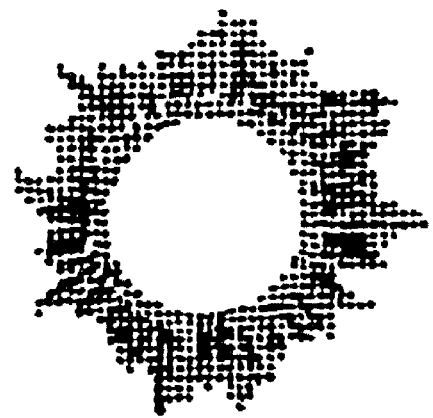
Figure 9:
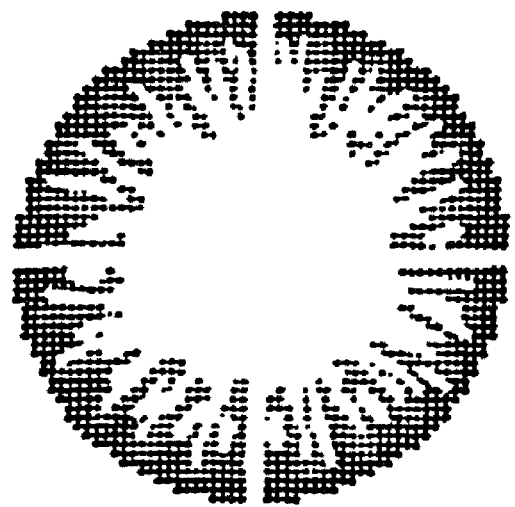
Figure 10:
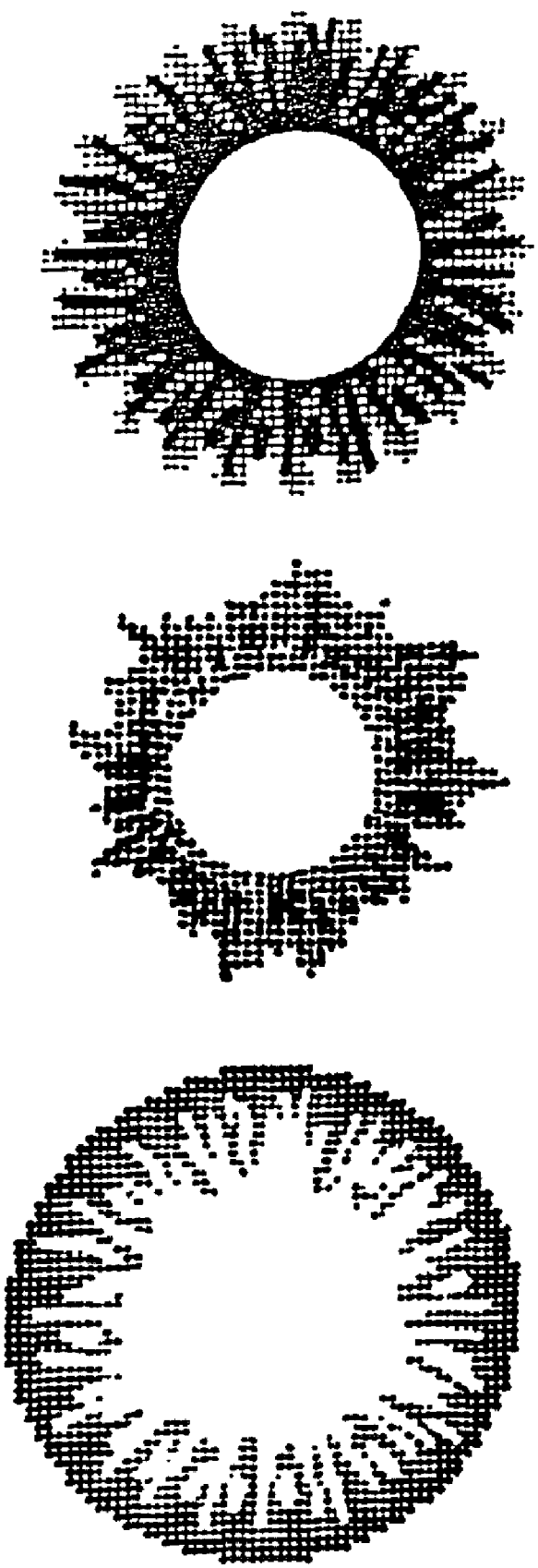
FIG. 10 illustrates three contact lens patterns in accordance with the present invention.
Figure 11:
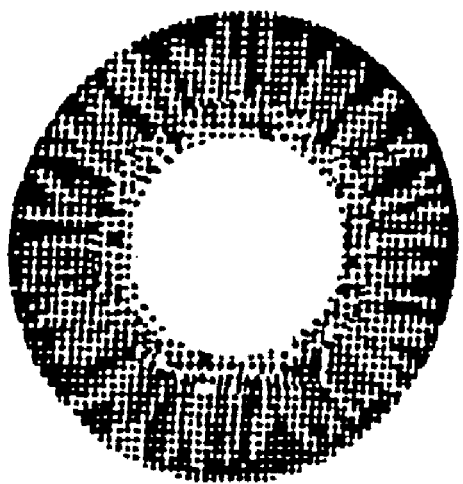
FIG. 11 illustrates three contact lens patterns in accordance with the present invention.
Figure 11:
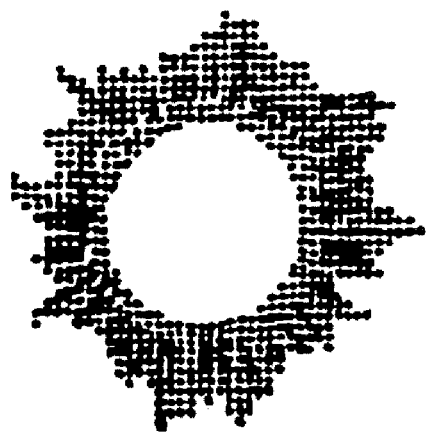
Figure 11:
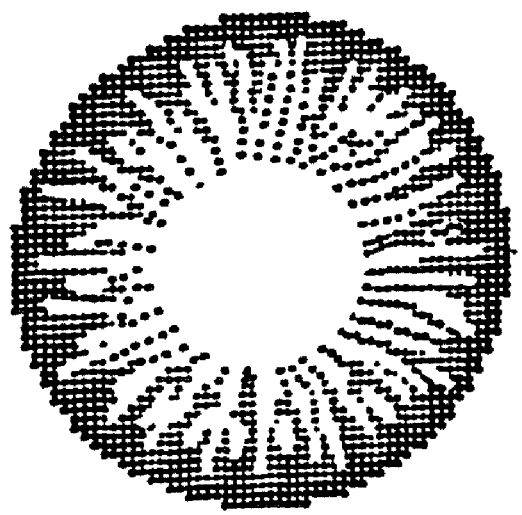
Figure 13:
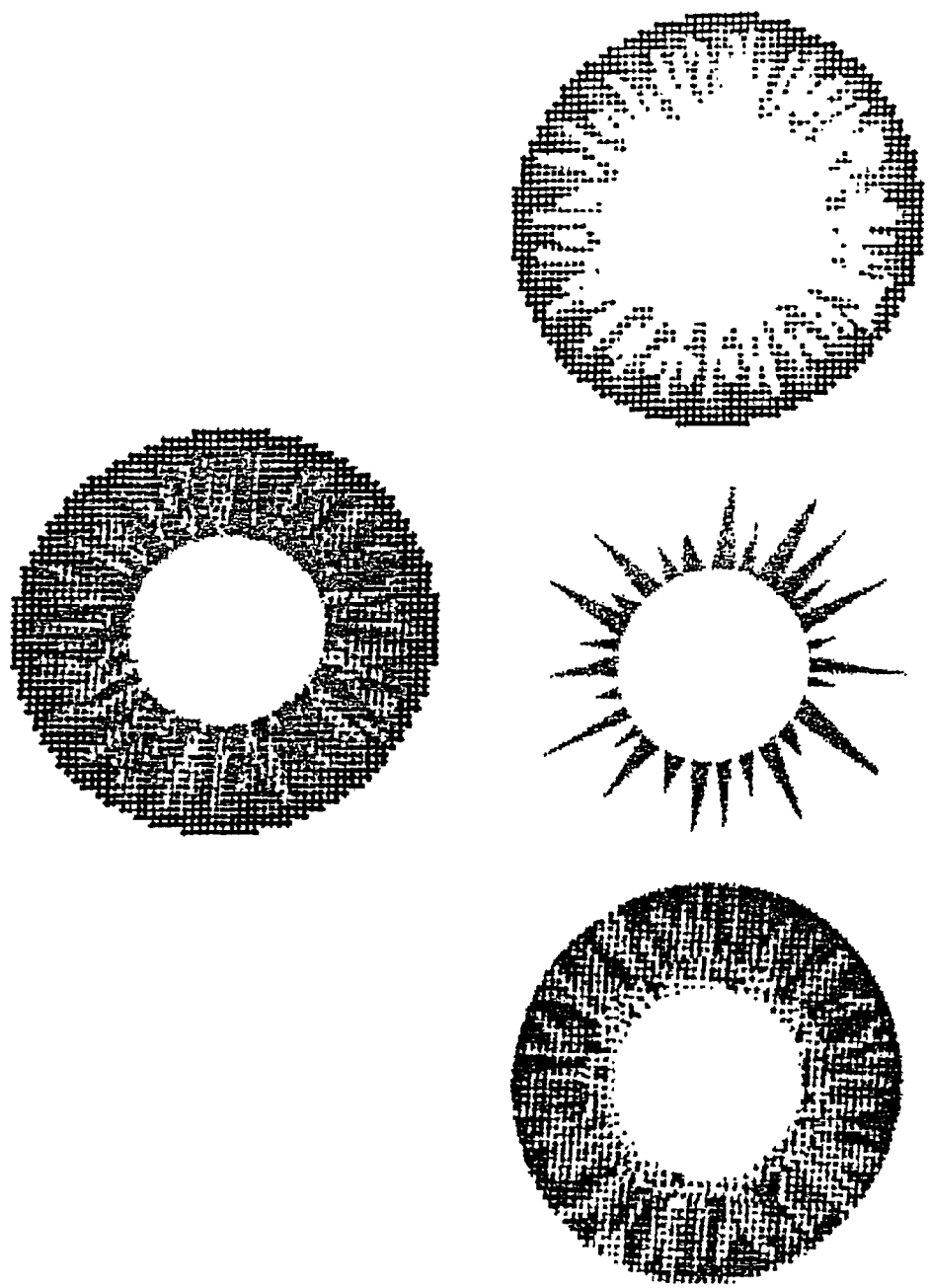
FIG. 13 illustrates three contact lens patterns and the combined contact lens design in accordance with the present invention.
Figure 14:
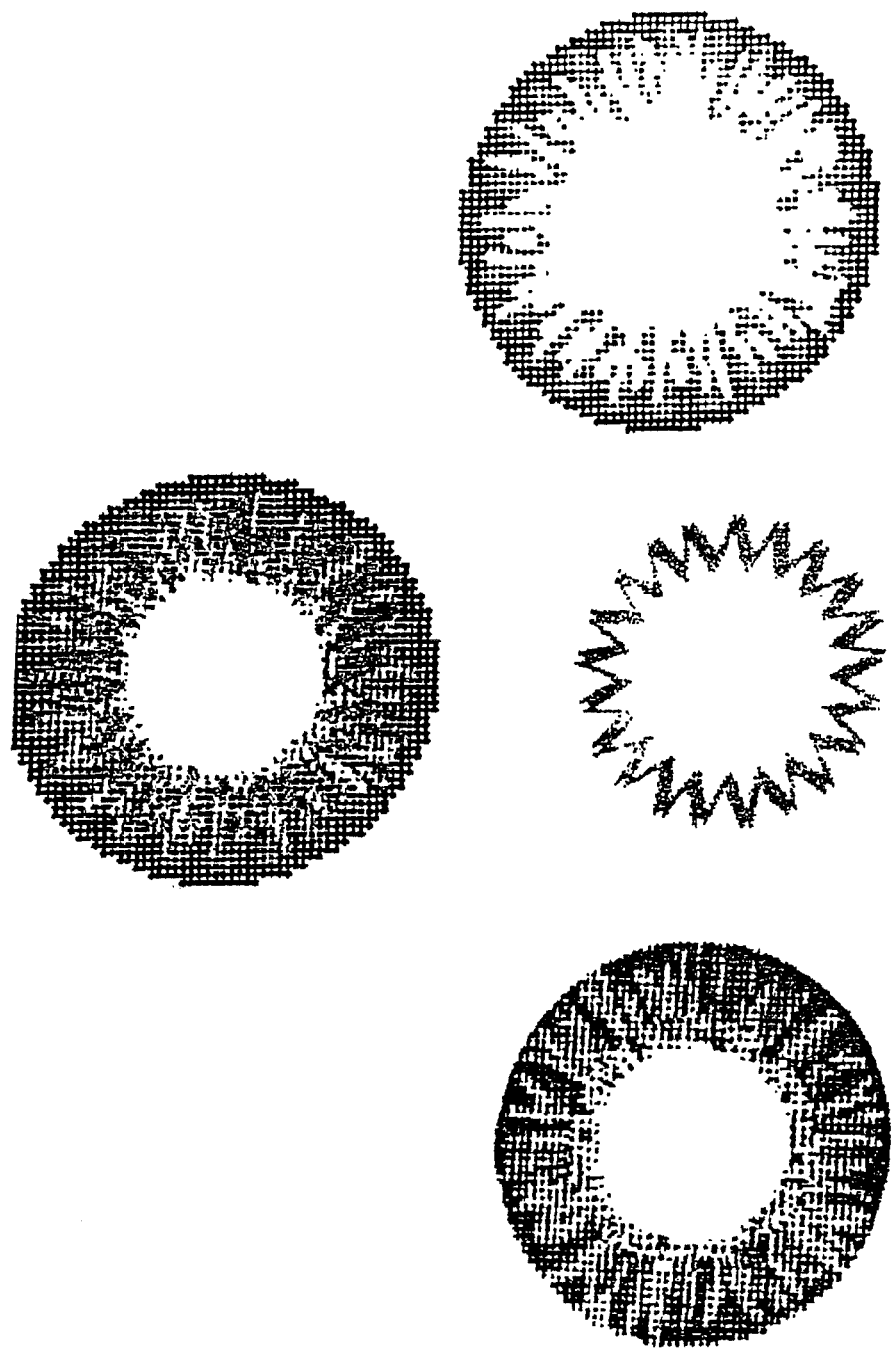
FIG. 14 illustrates three contact lens patterns and the combined contact lens design in accordance with the present invention.

In a preferred embodiment, a first uneven border differentiates the outermost starburst and the outer starburst portions of the pattern elements, however, the elements of the outermost and outer starbursts overlap, mix and blend together, either in actuality or merely in perception, to create the desired effect. A second uneven border differentiates the outer starburst and the inner starburst portions of the pattern. The elements of the outer and inner starbursts overlap, mix and blend together, either in actuality or in perception. If the patterns of FIGS. 2, 3 and 4 are merged to form a three color lens, the uneven edge of the pattern shown in FIG. 2 will merge and overlap with the pattern shown in FIG. 3 to form the first uneven border between the outermost and outer starbursts. Further, the uneven edge of the pattern shown in FIG. 4 will merge and overlap with the pattern shown in FIG. 3 to form the second uneven border between the outer and inner starbursts.

In certain patterns, the outer starburst may contain pattern that extends further toward the periphery of the lens than the pattern of the outermost starburst. In other patterns, the outer starburst may contain pattern that extends further toward the pupil section of the lens than the pattern of the inner starburst.

Alternative embodiments of the present invention include minimum and maximum distances of the uneven borders from the outer perimeter of the iris section. For example in one alternative embodiment, the minimum distance of the first uneven border from the outer perimeter of the iris section is from about 5% to about 60% of the radial width of the iris section, and the maximum distance of the uneven border from the outer perimeter of the iris section is from about 25% to about 95% of the radial width of the iris section, and the minimum distance of the second uneven border from the outer perimeter of the iris section is from about 15% to about 75% of the radial width of the iris section, and the maximum distance of the uneven border from the outer perimeter of the iris section is from about 50% to about 95% of the radial width of the iris section.

In another embodiment, the minimum distance of the first uneven border from the outer perimeter of the iris section is from about 15% to about 50% of the radial width of the iris section, and the maximum distance of the uneven border from the outer perimeter of the iris section is from about 45% to about 95% of the radial width of the iris section, and the minimum distance of the second uneven border from the outer perimeter of the iris section is from about 15% to about 65% of the radial width of the iris section, and the maximum distance of the uneven border from the outer perimeter of the iris section is from about 60% to about 95% of the radial width of the iris section.

In yet another alternative embodiment, the outer starburst pattern may extend to the periphery of the iris section of the contact lens, such that some elements that make up the outer starburst are outside of all of the elements that make up the outermost starburst pattern, and/or the elements that make up the outer starburst pattern extend closer to the pupil section such that some of those elements are inside all of the elements of the inner starburst pattern.

In yet another alternative embodiment, the inner starburst pattern creates an interdigitation configuration with either the outermost starburst pattern or the outer starburst pattern or both patterns. Further, the outermost starburst pattern may create an interdigitation configuration with the outer starburst pattern. In an interdigitation configuration, one pattern intersects another similar to the fingers on one hand placed between the fingers on the other hand in a planar fashion.

Figure 15:
FIG. 15 illustrates a three-pattern contact lens design in accordance with the present invention.
Figure 16:
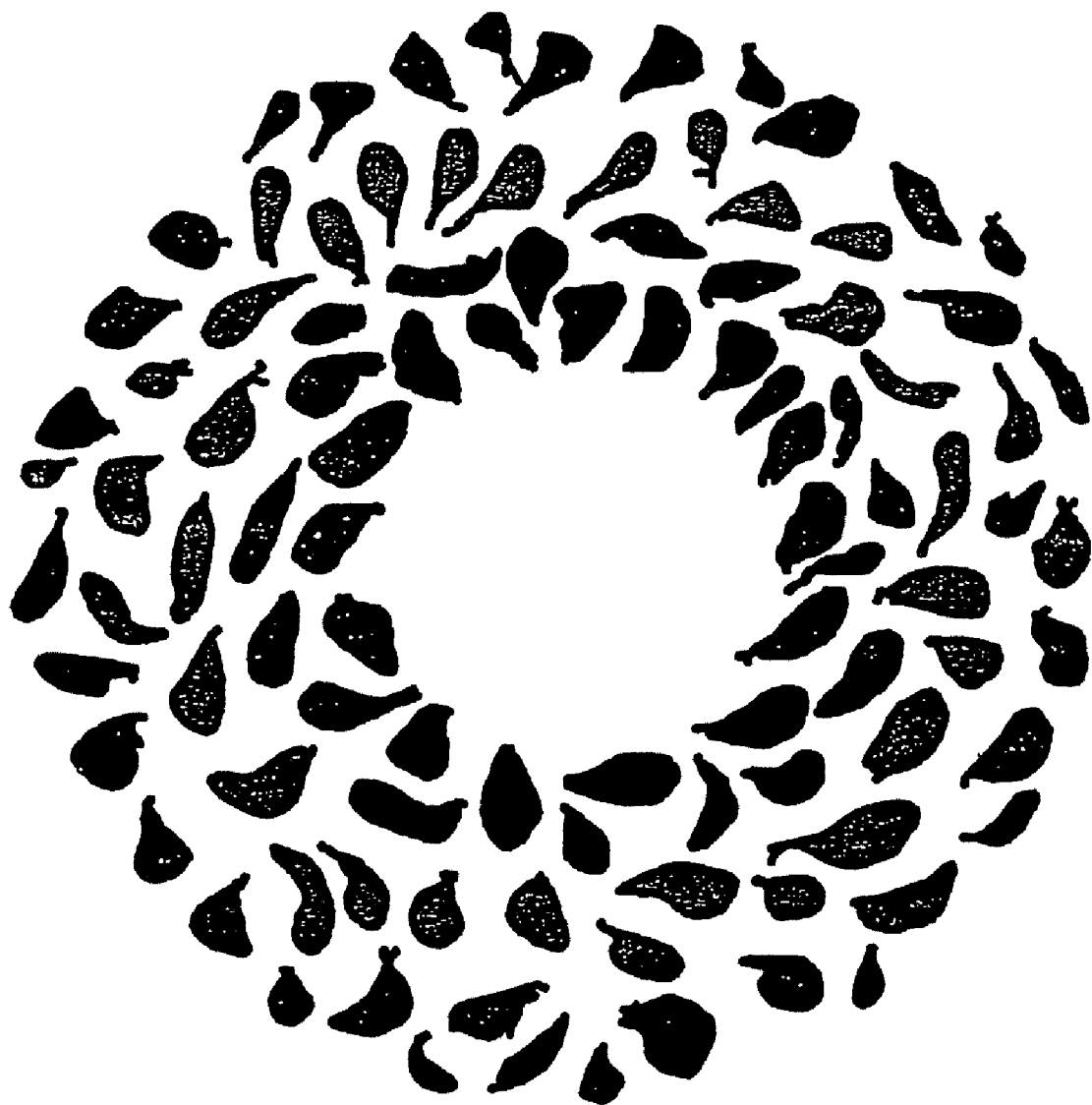
FIG. 16 illustrates a three-pattern contact lens design in accordance with the present invention.
Figure 17:
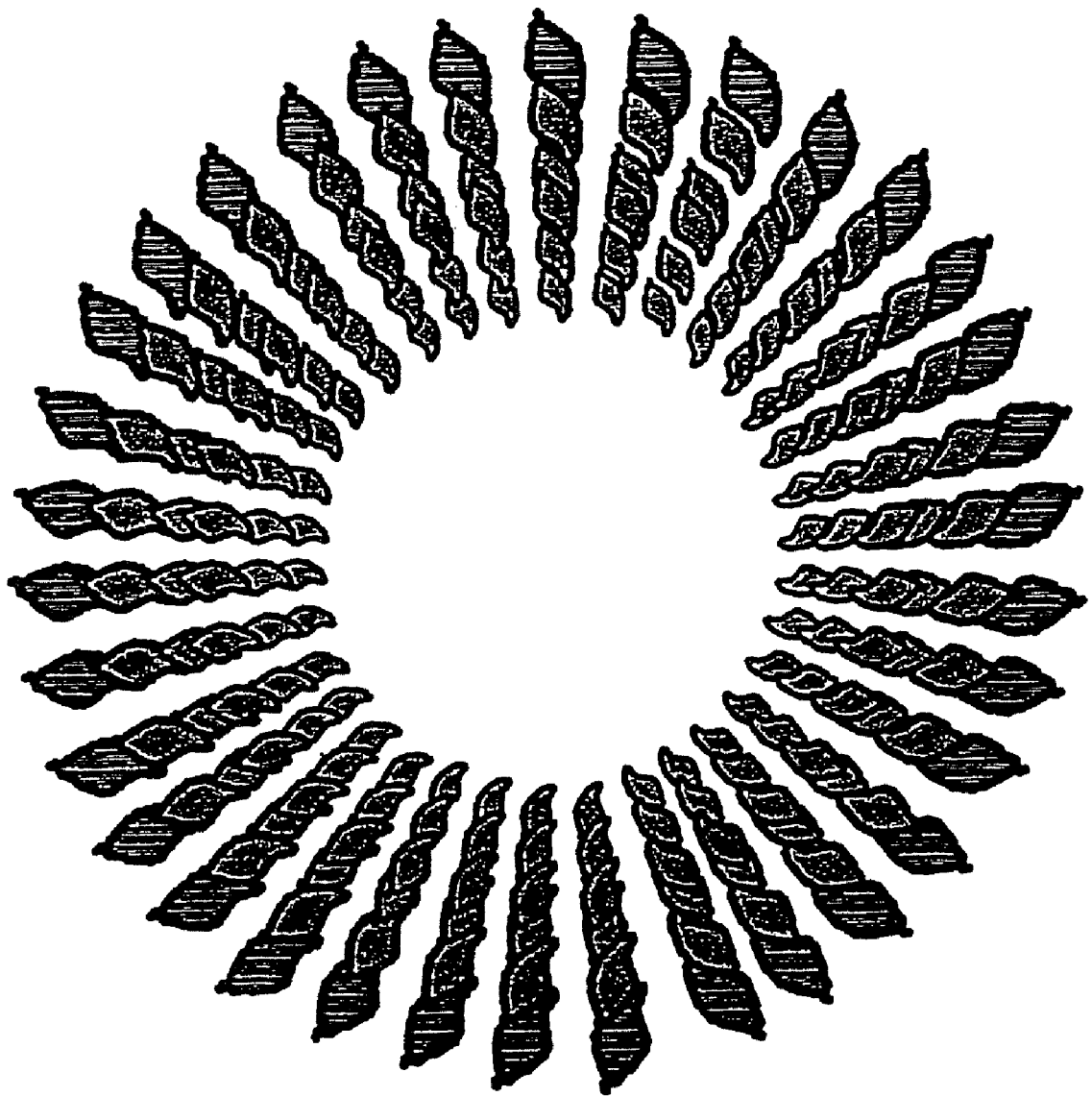
FIG. 17 illustrates a three-pattern contact lens design in accordance with the present invention.
Figure 18:
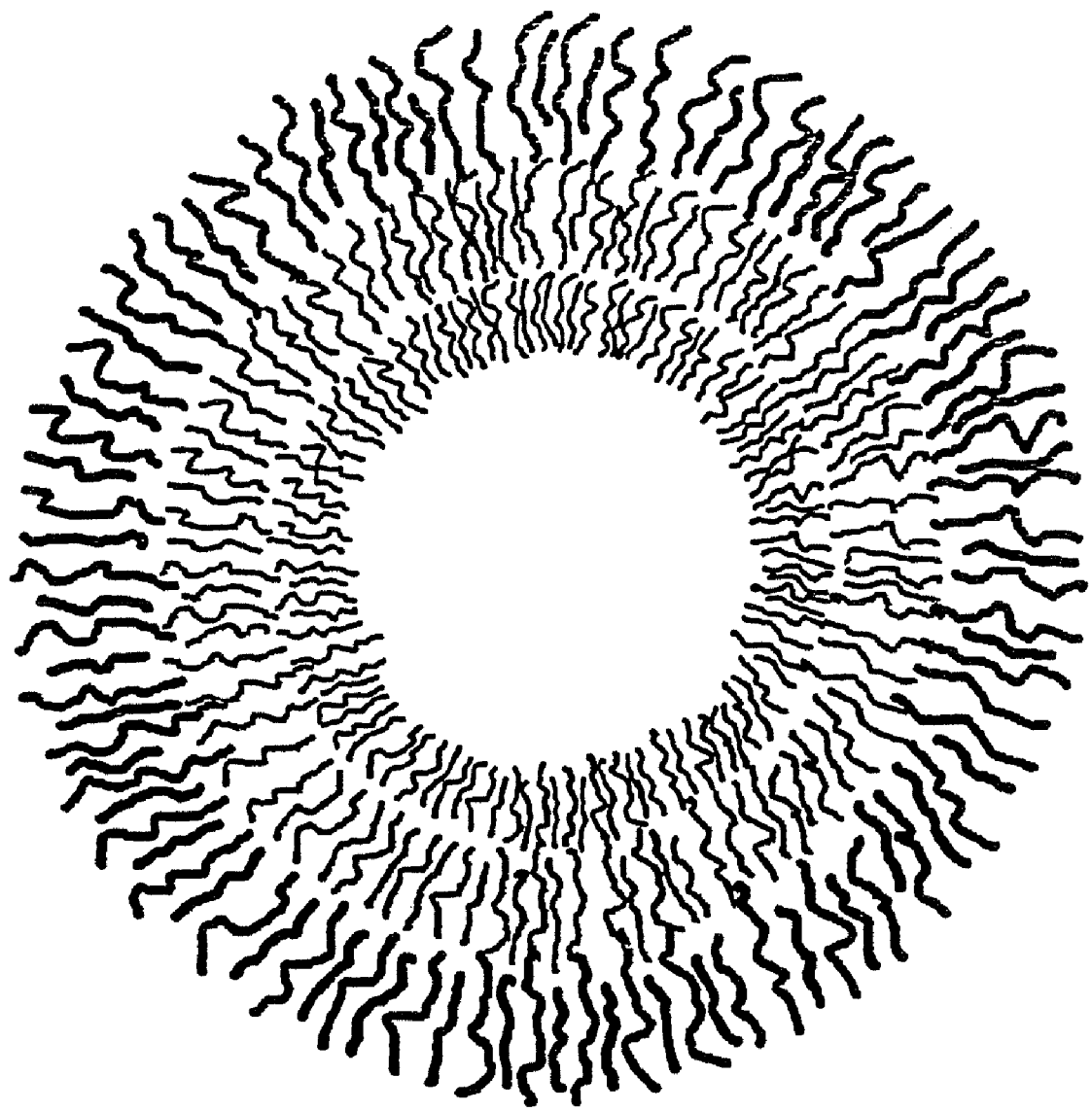
FIG. 18 illustrates a three-pattern contact lens design in accordance with the present invention.
Figure 19:
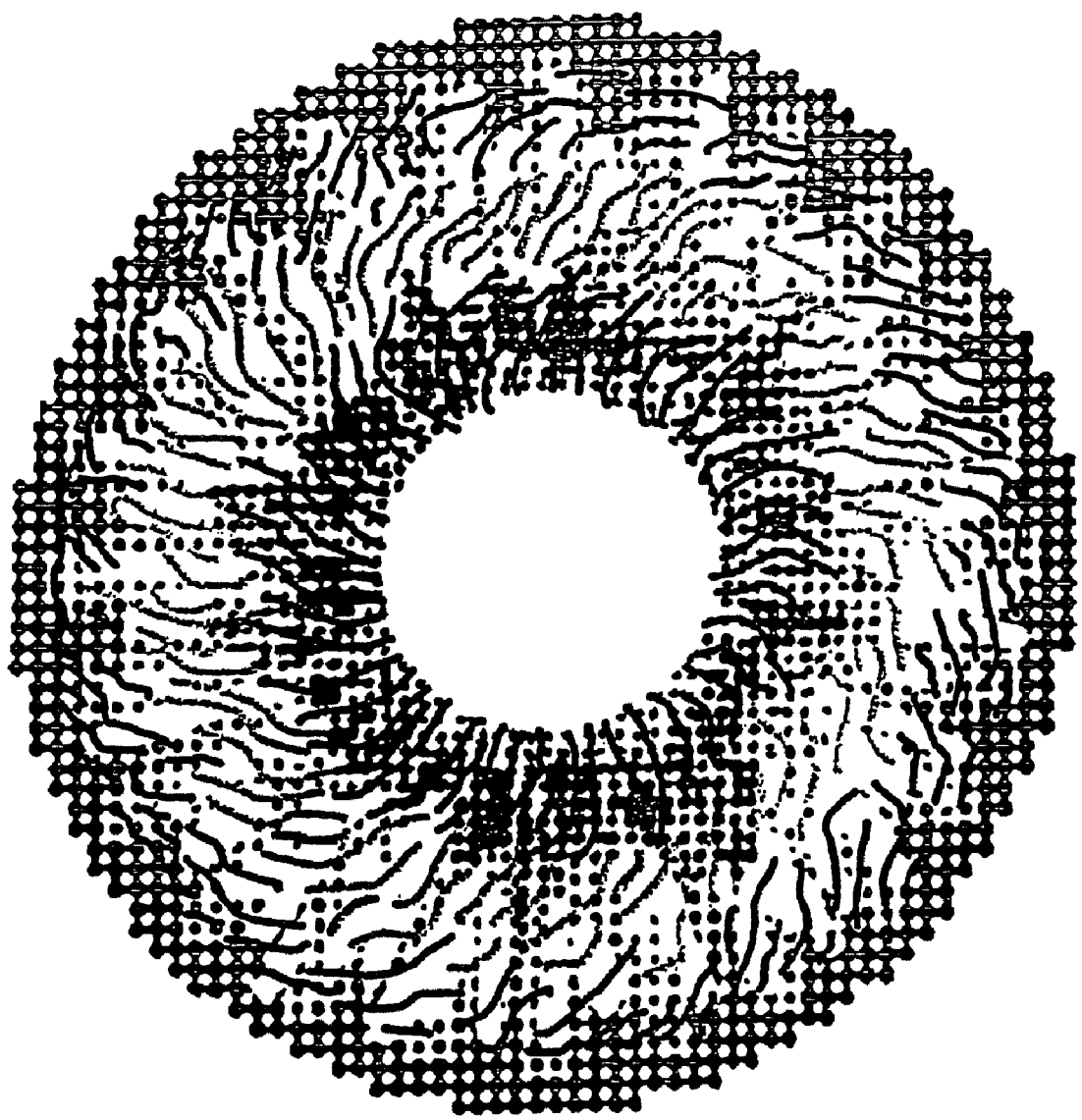
FIG. 19 illustrates a four-pattern contact lens design in accordance with the present invention.
Figure 20:
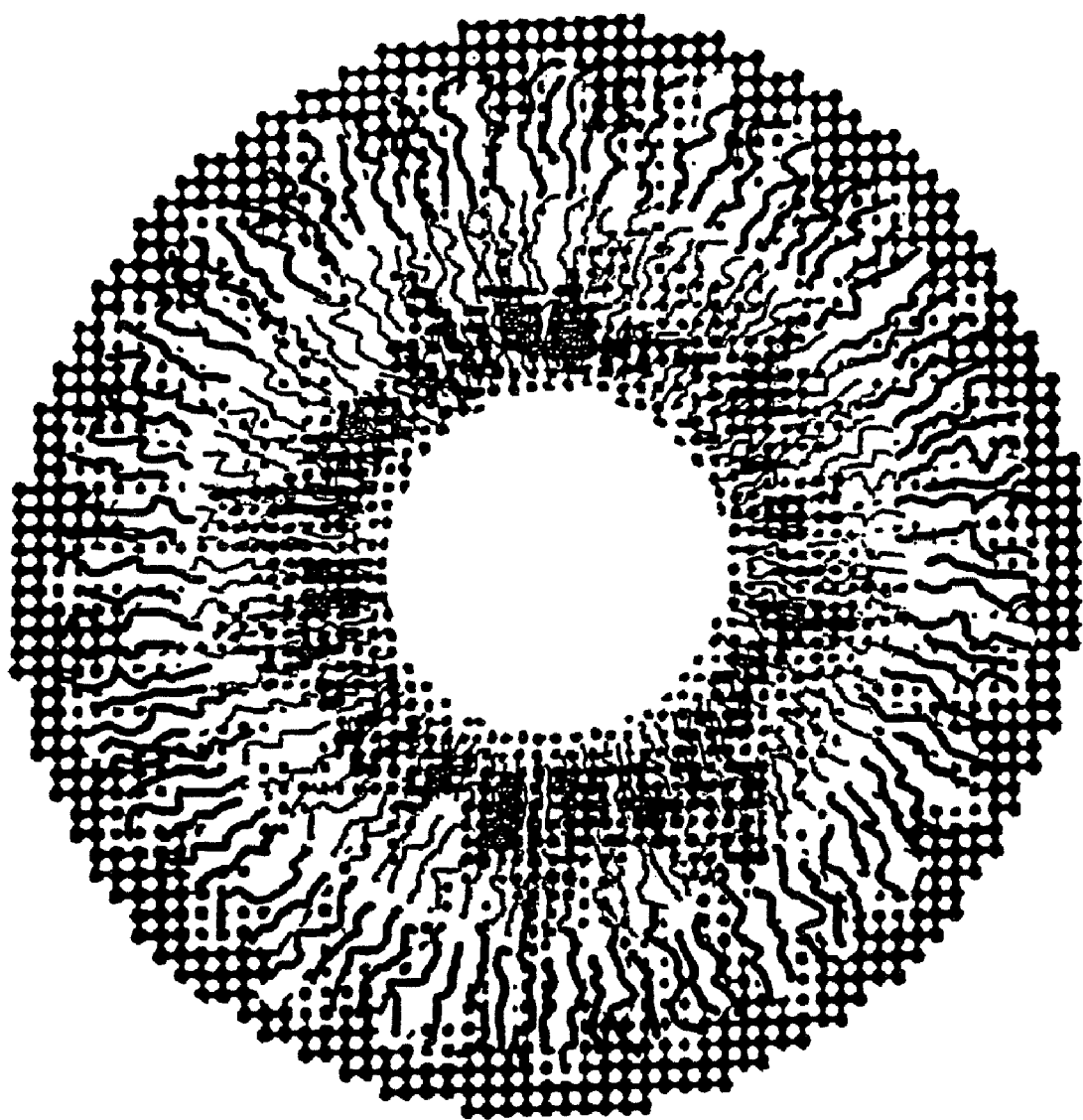
FIG. 20 illustrates a three-pattern contact lens design in accordance with the present invention.
Figure 21:
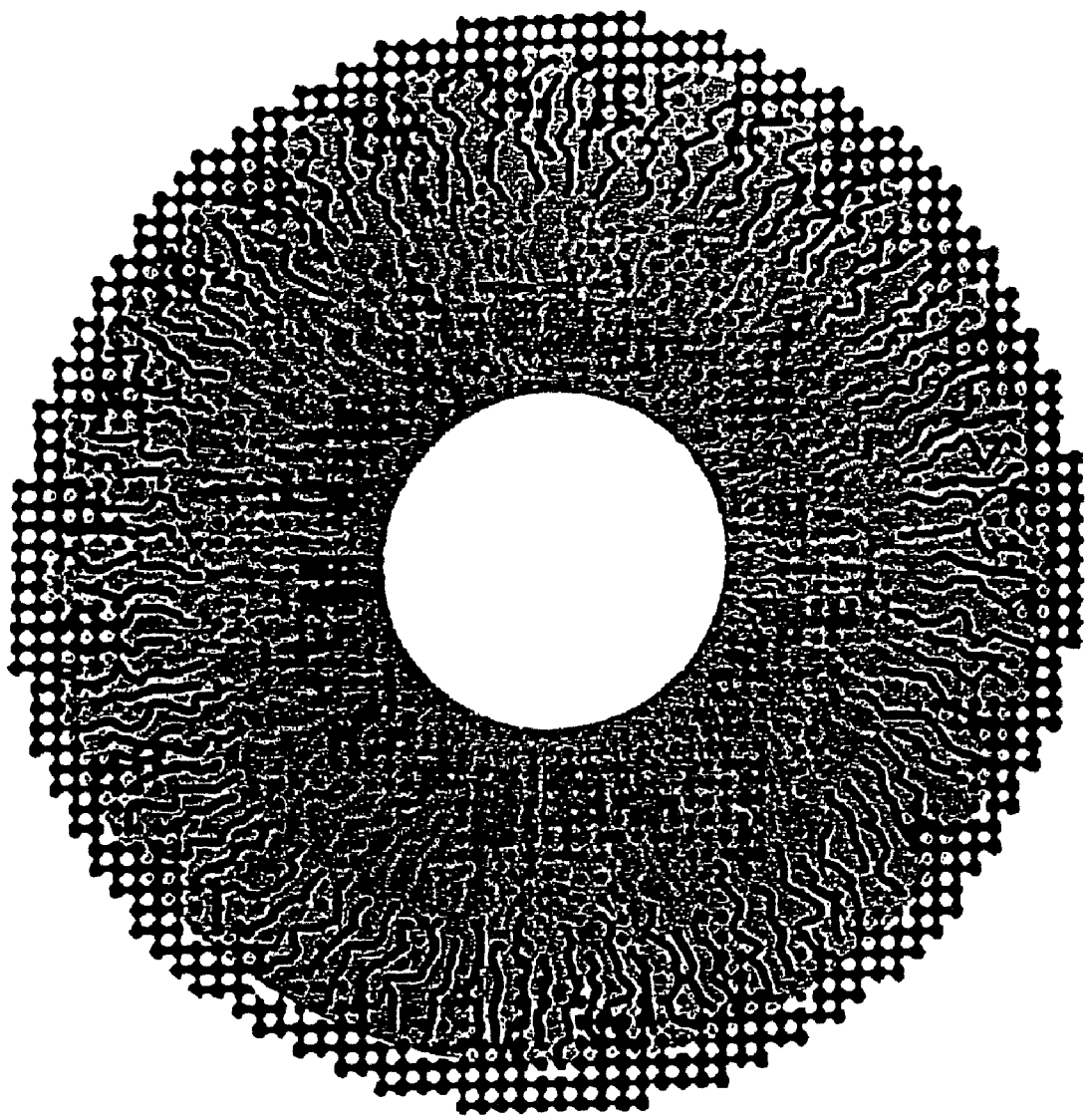
FIG. 21 illustrates a four-pattern contact lens design in accordance with the present invention.
Figure 22:
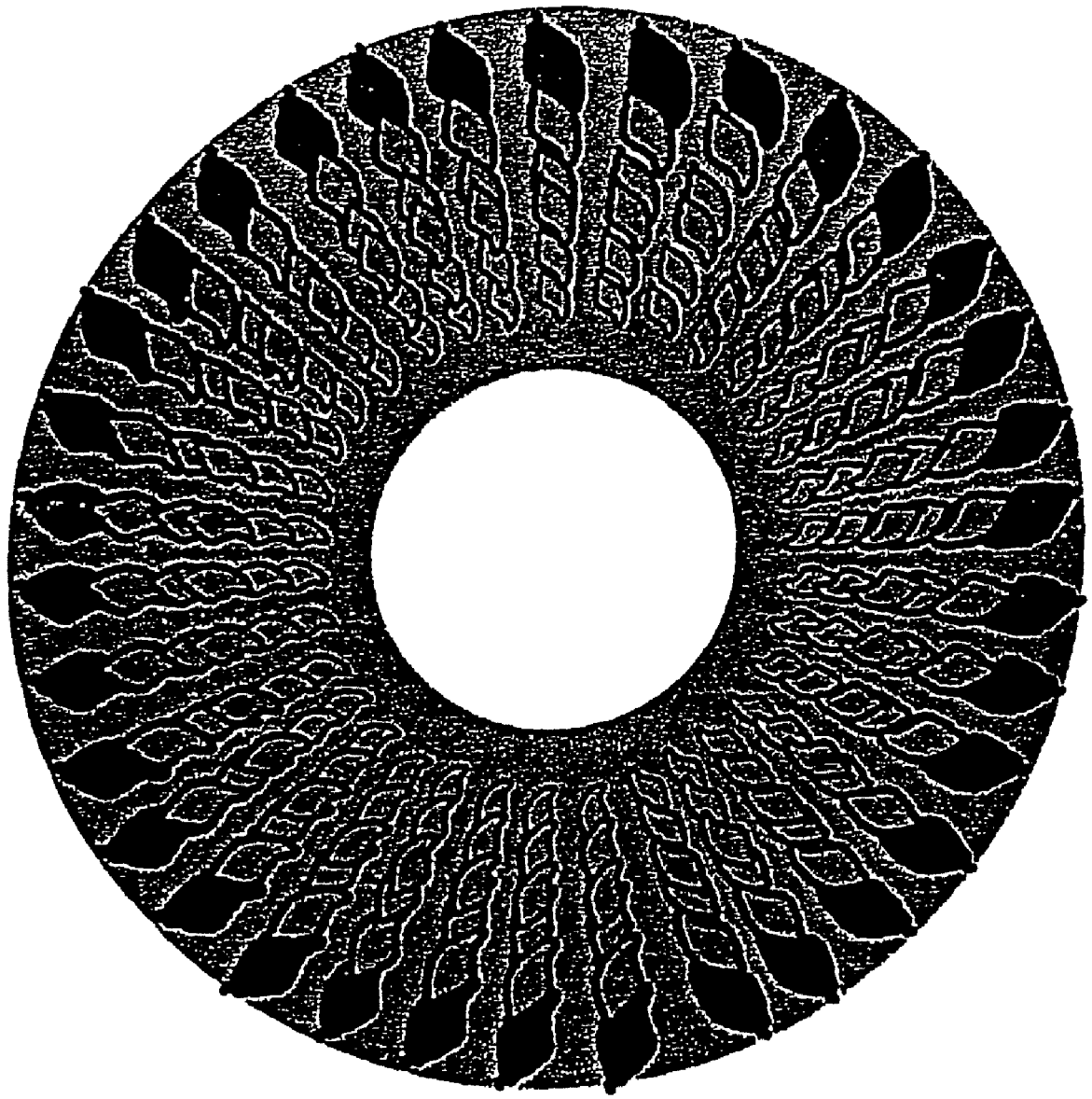
FIG. 22 illustrates a four-pattern contact lens design in accordance with the present invention.

Another embodiment is made up of a pattern in which at least one of the portions, and preferably more than one, is made up of a pattern or design which consists of elements which are or create uniform and non-uniform dots, islands of color, worms, corkscrews, starbursts, spokes, spikes, striations, radial stripes, zig-zags and/or streaks (see the examples in FIGS. 5-22). Also, a single color may be used as a background in conjunction with the multi-pattern design (see FIGS. 21 and 22). In these designs the portions may be the same, as in FIGS. 15 and 16, or different, as in FIGS. 19, 20 and 21. For example, if the outermost starburst is the same as that of FIG. 2, and the outer starburst is the one shown in FIG. 3, then the inner starburst may be a design in which radial stripes begin at the inner portion of the iris and travel in a radial direction toward the outer periphery of the iris. In this particular embodiment, the remaining multiple portions, whether there are two or more, are made up of a plurality of elements, which may be similar in design to the foregoing portion, combine to leave a substantial portion within the interstices of the pattern non-opaque.

Alternative embodiments include patterns designed such that the greatest concentration of elements having the darkest color or shaded portion are located generally on the outside of the concentration of the elements of the other portions. In particular, the darkest shaded portion has a greater concentration of elements generally located outside the portions with the lighter shaded portions. Another embodiment places the different portions having different shades such that the darkest portion has the greatest concentration of elements generally located on the outside of the other portions, and the next darkest portion has the greatest concentration of elements generally located outside the remaining portions' elements. This design continues until the lightest shaded portion has the greatest concentration of elements generally located inside all of the other portions.

Another embodiment includes patterns that are not continuous or concentric. In other words, these patterns, which may be of the type listed above, have noticeable non-opaque areas such that when viewed without the other patterns, the non-opaque areas are clearly visible. However, when these patterns are combined with other patterns, the overlapping, blending and mixing of these patterns creates a design that is able to change the apparent color of the iris, while imparting a very natural appearance.

Producing the opaque portions of the iris section is preferably accomplished by printing the lens three times using the known printing process of Knapp's U.S. Pat. No. 4,582,402, incorporated herein by reference, and the known printing process of Rawlings' U.S. Pat. Nos. 5,034,166 and 5,116,112, incorporated herein by reference. Generally, a plate or cliché having depressions in the desired pattern is smeared with ink of the desired shade. Excess ink is removed by scrapping the surface of the plate with a doctor blade leaving the depression filled with ink. A silicon rubber pad is pressed against the plate to pick up the ink from the depressions and then is pressed against a surface of the lens to transfer the pattern to the lens. The printed pattern is then cured to render it unremovable from the lens. Of course, either the anterior or posterior surfaces of the lens may be printed, but printing the anterior surface is presently preferred.

Preferred lenses and ink ingredients used to practice this invention are known and described in Loshaek's U.S. Pat. No. 4,668,240, incorporated herein by reference. The specific ingredients and target weights are described in detail below. Very briefly, a lens constructed of polymer having —COOH, —OH, or —NH$_2$ groups is printed with ink containing binding polymer having the same functional groups, opaque coloring substance, and a diisocyanate compound. First a solution of binding polymer and solvent is prepared and this solution is mixed with paste containing the coloring substance to form an ink. A preferred binding polymer solutions have a viscosity of about 35,000 CPS for blue, gray, brown and black, and 50,000 CPS for green. The opaque ink is printed and cured on the lens surface.

Ink pastes and pigments that can be utilized in the present invention can be made in a number of different ways using the ingredients and percentages (by weight) as described below in the ink color charts. For example, a hazel ink paste can be made using 63.49 percent binder solution (by weight), 30.00 percent ethyl lactate, 0.61 percent titanium dioxide, 0.06 percent PCN blue, 4.30 percent iron oxide yellow, and 1.54 percent iron oxide red. Although these colors are used for the preferred embodiments, other colors or variations of the weight percentage of ingredients may be used. The charts below are merely a representative example of the possible inks and pigment levels, and is not a complete list. One of ordinary skill in the art could develop other inks and pigment levels that would provide an enhancing effect to the iris of a person wearing the contact lens.

| | INK PASTE COLOR CODE | | | | | |
|---|---|---|---|---|---|---|
| | BLUE | | | GRAY | | |
| | Total Wt. (g) | | | | | |
| Ingredient | Weight Percent | 600 Target Weight | 3000 Target Weight | Weight Percent | 600 Target Weight | 3000 Target Weight |
| Ethyl Lactate | 30.55 | 183.30 | 916.50 | 30.75 | 184.50 | 922.50 |
| Binder Soln | 61.15 | 366.90 | 1834.50 | 59.84 | 359.10 | 1795.50 |
| PCN Blue | 1.21 | 7.26 | 36.30 | | | |
| PCN Green | | | | 0.23 | 1.38 | 6.90 |
| TiO$_2$ | 7.09 | 42.54 | 212.70 | 7.34 | 44.04 | 220.20 |
| IO Black | | | | 1.83 | 10.98 | 54.90 |
| Grinding Media | | 600 | 3000 | | 600 | 3000 |

| | INK PASTE COLOR | | | | | |
|---|---|---|---|---|---|---|
| | BROWN | | | HAZEL | | |
| | Total Wt. (g) | | | | | |
| Ingredient | Weight Percent | 651 Target Weight | 3000 Target Weight | Weight Percent | 651 Target Weight | 3000 Target Weight |
| Ethyl Lactate | 30.00 | 180.00 | 900.00 | 30.00 | 180.00 | 900.00 |
| Binder Soln | 55.10 | 330.60 | 1653.00 | 63.49 | 380.94 | 1904.70 |
| PCN Blue | | | | 0.06 | 0.36 | 1.80 |
| TiO$_2$ | | | | 0.61 | 3.65 | 18.3 |
| IO Black | 5.70 | 34.20 | 171.00 | | | |
| IO Red | 3.45 | 20.70 | 103.50 | 1.54 | 9.25 | 46.20 |
| IO Yellow | | | | 4.30 | 25.80 | 129.00 |
| IO Brown | 5.75 | 34.50 | 172.50 | | | |
| Grinding Media | | 600 | 3000 | | 600 | 3000 |

| | INK PASTE COLOR | | | | | |
|---|---|---|---|---|---|---|
| | GREEN | | | BLACK | | |
| | Total Wt. (g) | | | | | |
| Ingredient | Weight Percent | 651 Target Weight | 3000 Target Weight | Weight Percent | 651 Target Weight | 3000 Target Weight |
| Ethyl Lactate | 28.53 | 185.73 | 855.90 | 23.98 | 156.11 | 719.40 |
| Binder Soln | 63.85 | 415.66 | 1915.50 | 64.04 | 416.90 | 1921.20 |
| PCN Blue | 0.03 | 0.20 | 0.90 | | | |
| IO Black | | | | 11.98 | 77.99 | 359.4 |
| Cr$_2$O$_3$ | 7.59 | 49.41 | 227.70 | | | |
| Grinding Media | | 850 | 4298 | | 850 | 4298 |

| | INK PASTE COLOR | | | | | |
|---|---|---|---|---|---|---|
| | TURQUOISE | | | ORANGE | | |
| | Total Wt. (g) | | | | | |
| Ingredient | Weight Percent | 600 Target Weight | 3000 Target Weight | Weight Percent | 600 Target Weight | 3000 Target Weight |
| Ethyl Lactate | 30.00 | 180.00 | 900.00 | 30.00 | 180.00 | 900.00 |
| Binder Soln | 58.16 | 348.96 | 1744.80 | 58.00 | 348.00 | 1740.00 |
| PCN Blue | 0.63 | 3.78 | 18.90 | | | |
| PCN Green | 2.25 | 13.50 | 67.50 | | | |
| TiO$_2$ | 8.88 | 53.28 | 266.40 | | | |
| IO Red | | | | 6.00 | 36.00 | 180.00 |
| Carbazole Violet | 0.08 | 0.48 | 2.40 | | | |
| Hydrophobic IO | | | | 6.00 | 36.00 | 180.00 |
| Grinding Media | | 600.00 | 5000.00 | | 850.00 | 4298.00 |

Of course, alternative ways to form colored opaque elements of the lens may be used. For example, selected portions of the iris section of a wetted hydrophilic lens may be impregnated with a solution of a first substance, such as barium chloride. Then the lens may be immersed in a solution of a second substance, such as sulfuric acid, that forms an opaque, water-insoluble precipitate with the first substance, for example barium sulfate. Thus an opaque precipitate forms within the lens in a predetermined pattern in the iris section. Next all or at least the opaque pattern of the iris section is colored opaque pattern in accordance with the invention. If the entire iris is colored with translucent tint, then the interstices within the pattern will be translucently colored, but still non-opaque and in accordance with a preferred embodiment of the present invention. Optionally, the pupil section of the lens may be colored by a non-opaque tint, because such tint is not visible when the lens is against the dark pupil present in the eye of the wearer. Other alternative opaquing methods include use of a laser (U.S. Pat. No. 4,744,647) and finely ground particles U.S. Pat. No. 4,460,523.

The process of the present invention for making colored contact lenses is as follows. A transparent contact lens comprising at least a pupil section and an iris section surrounding the pupil section is provided.

If the lens is constructed of a hydrophilic material, it also has a peripheral section surrounding iris section. For hydrophilic material, the steps described below are performed with the material in an unhydrated state. Preferred hydrophilic materials are disclosed by Loshaek in U.S. Pat. No. 4,405,773, incorporated herein by reference.

The colored pattern may be deposited onto iris section of the lens in any manner. A currently preferred method is by offset pad printing, described below in some detail.

A plate as (not shown) is prepared having a flat surface and circular depressions corresponding to the desired dot pattern. To make the pattern shown in FIGS. 2, 3 and 4, each depression should have a diameter of approximately 0.1 mm, and a depth of approximately 0.013 mm. The depressions are arranged to cover an annular shape corresponding to that of the iris section of the lens.

The plate may be made by a technique that is well known for making integrated analog or digital circuits. First, a pattern about 20 times as large as the desired pattern is prepared. Next, the pattern is reduced using well-known photographic techniques to a pattern of the exact desired size having the portion to be colored darker than the remaining area. A flat surface is covered by a photo resist material that becomes water insoluble when exposed to light. The photo resist material is covered with the pattern and exposed to light. The portion of the photo resist pattern is removed by washing with water and the resulting plate is etched to the required depth. Then the remainder of the photo resist material is mechanically removed.

Colorant, comprising a pigment and binder or carrier for the pigment is deposited on the flat surface of the plate and scraped across the pattern with a doctor blade. This causes the depressions to be filled with ink while removing excess ink from flat surface. The colorant may be more or less opaque depending on the degree of color change desired. The opacity may be varied by modifying the proportion of pigment to binder in the colorant. A desired affect may be obtained using a highly opaque colorant or by having a somewhat less opaque colorant and covering a greater portion of the iris section surface.

A pad made of silicon rubber, impregnated with silicon oil for easy release, is pressed against the pattern, removing ink from the depressions. The ink on the pad is allowed to dry slightly to improve tackiness, then pressed against the front surface of the contact lens, which deposits the ink in the desired pattern over the iris section. The pad should have enough flexibility to deform to fit over the convex front surface of the lens. For a more natural effect, the printing step may be repeated one or more times using different patterns in different colors, since upon close examination, the iris's of many persons are found to contain more than one color. The printed pattern need not be absolutely uniform, allowing for enhancement of the fine structure of the iris.

Next the deposited pattern is treated to render it resistant to removal from the lens under exposure to the ocular fluids that the lens will encounter when placed in the eye. The exact method of preventing removal depends on the material of construction of the lens and the pattern. Mere air drying or heating the lens may suffice. For hydrophilic lenses, the techniques for coating the opaque pattern described in Wichterle, U.S. Pat. No. 3,679,504 (incorporated herein by reference), may be used.

The method for manufacturing a colored contact lens generally includes the steps of applying three portions of colorant to the surface of a transparent contact lens and rendering the colorant resistant to removal from ocular fluids. The printed contact lens has a non-opaque pupil section and an iris section surrounding said pupil section with the three portions of colorant. The first portion of colorant, or outermost starburst, is of a first shade, the second portion of colorant, the outer starburst, is a second shade which is different from the first shade, and the third portion of the colorant, or the inner starburst, is a third shade which is different from the second shade and may or may not be the same as the first shade. The outermost starburst may be located such that the greatest concentration of elements of the outermost starburst are located generally on the outside of, but still within, the iris section, and generally on the outside of the concentration of elements of the outer starburst. The greatest concentration of elements of the outer starburst is located generally on the outside of the greatest concentration of elements of the inner starburst, and a first uneven border differentiates the outermost starburst and the outer starburst, although the outermost starburst and the outer starburst potions will overlap. A second uneven border differentiates the outer starburst and the inner starburst, although the outer and inner starbursts overlap. Thus, a lens capable of changing the apparent color of the iris of a person wearing the lens and imparting a very natural appearance is provided.

The steps used to deposit the intermittent pattern on the lens surface include using a first plate having depressions corresponding to the first portion or outermost starburst and filling the depressions with colorant of the first shade, preferably black. The next step is pressing a first flexible pad against the first plate and subsequently pressing the first flexible pad against the surface of the lens (either side) thereby printing the first portion of the elements.

The next step involves using a second plate having depressions corresponding to the second portion or outer starburst and filling in the depressions with colorant of the second shade which is different from the first shade, preferably blue, green, gray or brown. The next step is pressing the second flexible pad against a second plate and pressing the second flexible pad against the surface of the lens (either the same or the opposite surface) thereby printing the second portion of the elements.

The final step involves using a third plate having depressions corresponding to the third portion or inner starburst and filling the depressions with colorant of the third shade which is different from the second shade and is either the same or different from the first shade, preferably hazel. Pressing a third flexible pad against the third plate and pressing the third flexible pad against said surface of the lens (either side) thereby printing the third portion of the elements.

Although the steps listed above place an order to the printing of the portions on the lens, the order of printing is not important to the present invention and any other order of printing would be covered by the present invention. Further, the process described above may include the maximum and minimum distances, creating the uneven borders, previously listed in the alternative embodiments.

An alternative embodiment for printing the different layers on the iris section of the contact lens provides for ink-jet printing instead of pad printing of each layer. Ink-jet printing is accomplished without the need of pads or plates and can be administered at a higher resolution than pad printing, thereby providing for greater detail of each colored layer and a more natural final pattern on the iris section of the contact lens.

Using ink-jet printing also reduces the number of devices that make contact either with the contact lens or with other devices. For example, a silicon pad must make contact with a plate or cliché initially and then with the contact lens itself. Contact between the parts tends to wear down the parts, which will then require replacements. During the ink-jet process, the micro-nozzles do not physically make contact with the contact lens, nor with any other device. The chance of the micro-nozzle wearing out is thereby reduced.

Further, the ink-jet printer is electronically controlled such that changing from one color layer to a different color layer can be done easily, by computer control. Thus, once a contact lens design is determined and separated into its multiple colored layers, each layer can be applied to the colored contact lens using an ink-jet process, thereby creating a colored contact lens capable of changing the apparent color of the wearer's iris.

It can be seen that the present invention provides lenses capable of changing the appearance of the wearer's iris, while allowing visualization of the fine structure thereof. Various changes may be made in the function and arrangement of parts: equivalent means may be substituted for those illustrated and described; and certain features may be used independently from others without departing from the spirit and scope of the invention as defined in the following claims.

The invention claimed is:

1. A contact lens, comprising:
 a non-opaque pupil section;
 an iris section surrounding the pupil section; and
 a colored opaque intermittent pattern overlying about 20% of the iris section, wherein the colored opaque intermittent pattern comprises
  an outermost starburst portion comprising dots of a first shade;
  an outer starburst portion comprising dots of a second shade and overlapping at least a portion of the outermost starburst portion, wherein the first and second shades are different from one another; and
  an inner starburst portion comprising dots of a third shade and overlapping at least a portion of the outer starburst portion, wherein the overlapping of the dots of the outer starburst portion and the inner starburst portion blend together to produce a fourth shade, wherein the overlapping of the dots of the outermost starburst and the outer starburst and the overlapping of the dots of the outer starburst and the inner starburst are indiscernible to an ordinary person, and wherein the contact lens is capable of changing the apparent color of the iris of the wearer of the lens while imparting a natural appearance.

2. The contact lens of claim 1, wherein the dots are at least one of round, square, hexagonal, or elongated dots.

3. The contact lens of claim 1, wherein the colored, opaque intermittent pattern further includes a plurality of interstices between the dots, wherein the interstices are non-opaque.

4. The contact lens of claim 3, wherein the non-opaque interstices are translucently colored.

5. The contact lens of claim 3, wherein the non-opaque interstices are uncolored.

6. The contact lens of claim 1, wherein the first and third shades are the same color.

7. A contact lens, comprising:
 a non-opaque pupil section;
 an iris section surrounding the pupil section; and
 a colored opaque intermittent pattern overlying no more than about 30% of the iris section, wherein the colored opaque intermittent pattern comprises
  an outermost starburst portion comprising dots of a first shade, wherein the first shade includes the darkest color of the pattern;
  an outer starburst portion comprising dots of a second shade and overlapping at least a portion of the outermost starburst portion, wherein the first and second shades are different from one another; and
  an inner starburst portion comprising dots of a third shade and overlapping at least a portion of the outer starburst portion, wherein the overlapping of the dots of the outer starburst portion and the inner starburst portion blend together to produce a fourth shade, wherein the overlapping of the dots of the outermost starburst and the outer starburst and the overlapping of the dots of the outer starburst and the inner starburst are indiscernible to an ordinary person, and wherein the contact lens is capable of changing the apparent color of the iris of the wearer of the lens while imparting a natural appearance.

8. The contact lens of claim 7, further comprising an uneven border between each portion.

9. The contact lens of claim 7, wherein the shade of the outermost starburst portion is at least one of black, gray, dark brown, and dark blue.

10. The contact lens of claim 7, wherein the shade of the outer starburst portion is at least one of blue, gray brown, light blue, turquoise, violet, blue violet, aqua, yellow, and green.

11. A contact lens, comprising:
 a non-opaque pupil section;
 an iris section surrounding the pupil section; and
 a colored opaque intermittent pattern overlying no more than about 30% of the iris section, wherein the colored opaque intermittent pattern comprises
  an outermost starburst portion comprising dots of a first shade;
  an outer starburst portion comprising dots of a second shade and overlapping at least a portion of the outermost starburst portion, wherein the first and second shades are different from one another; and
  an inner starburst portion comprising dots of a third shade and overlapping at least a portion of the outer starburst portion, wherein the overlapping of the dots of the outer starburst portion and the inner starburst portion blend together to produce a fourth shade, wherein the overlapping of the dots of the outermost starburst and the outer starburst and the overlapping of the dots of the outer starburst and the inner starburst are indiscernible to an ordinary person, wherein the contact lens is capable of changing the apparent color of the iris of the wearer of the lens while imparting a natural appearance, and wherein the shade of the inner starburst portion is at least one of hazel, yellow, yellow green, brown, yellow brown, gold, and orange.

12. The contact lens of claim 11, wherein the dots of the outermost starburst portion extend to a periphery of the lens.

* * * * *